United States Patent [19]

Kagiura et al.

[11] Patent Number: 5,191,377
[45] Date of Patent: Mar. 2, 1993

[54] ORIGINAL SCANNING APPARATUS WITH ELECTRICAL CONNECTING MEMBER

[75] Inventors: Kazuo Kagiura, Tokyo; Tatsuya Shiratori, Kawasaki; Naomasa Kimura; Eiichi Ando, both of Yokohama; Masanari Shirai, Chigasaki; Yoshikuni Toyama; Hiroyoshi Maruyama, both of Yokohama; Masashi Ohashi, Tokyo, all of Japan

[73] Assignee: Canon Kabushiki Kaisha, Tokyo, Japan

[21] Appl. No.: 769,482

[22] Filed: Oct. 1, 1991

Related U.S. Application Data

[63] Continuation of Ser. No. 459,553, Jan. 2, 1990, abandoned, which is a continuation of Ser. No. 311,280, Feb. 16, 1989, abandoned.

[30] Foreign Application Priority Data

Feb. 19, 1988 [JP] Japan .................................. 63-037228

[51] Int. Cl.⁵ .............................................. G03G 15/04
[52] U.S. Cl. ...................................... 355/235; 355/229
[58] Field of Search ................ 355/233, 235, 228, 229; 358/497

[56] References Cited

U.S. PATENT DOCUMENTS

| | | | |
|---|---|---|---|
| 4,073,584 | 2/1978 | Kitajima | 355/235 |
| 4,402,595 | 9/1983 | Ogawa et al. | 355/235 |
| 4,500,197 | 2/1985 | Dannatt | 355/235 |
| 4,538,903 | 9/1985 | Lane | 355/235 |
| 4,557,592 | 12/1985 | Yokoyama et al. | 355/235 X |
| 4,603,963 | 8/1986 | Hinton et al. | 355/235 |
| 4,671,649 | 6/1987 | Schiemann et al. | 358/235 X |
| 4,704,638 | 11/1987 | Igarashi | 358/497 X |
| 4,728,986 | 3/1988 | Ravenshear | 355/235 |
| 4,792,828 | 12/1988 | Ozawa et al. | 355/14 R |

FOREIGN PATENT DOCUMENTS 59-109037  6/1984  Japan .................................. 355/235

*Primary Examiner*—Joan H. Pendegrass
*Attorney, Agent, or Firm*—Fitzpatrick, Cella, Harper & Scinto

[57] ABSTRACT

An original scanning apparatus comrpises a scanning unit for scanning an original. The scanning unit has a mirror and a light source for illuminating the original. A connecting member is electrically connected to the scanning unit. A guide member supports and guides one end of the scanning unit. The guide member fixes a position of the one end of the scanning unit in a vertical direction. At least a part of a driving element is disposed at the position overlapping with the guide member in the vertical direction, but not overlapping with the mirror of the scanning unit. The connecting member is provided at the side of the guide member.

27 Claims, 6 Drawing Sheets

ORIGINAL SCANNING APPARATUS WITH ELECTRICAL CONNECTING MEMBER

This application is a continuation of application Ser. No. 07/459,553 filed Jan. 2, 1990, which is a continuation of application Ser. No. 07/311,280 filed Feb. 16, 1989, both now abandoned.

BACKGROUND OF THE INVENTION

1. Field of the Invention

The present invention relates to an original scanning apparatus used with an electrophotographic copying machine, image reader and the like, and, more particularly, it relates to an original scanning apparatus which scans an original by driving a scanning unit.

2. Related Background Art

In the past, original scanning apparatuses of this kind, for example, an optical scanning apparatus as shown in FIG. 10 have already been known. This known optical scanning apparatus is intended to be used with an electrophotographic copying machine and the like, and includes a scanning unit 100 having an illumination lamp 102 for illuminating a surface of an original (not shown). The scanning unit 100 is slidably mounted, at its one end, on a guide rail 103 extending in a direction along which original is scanned, and is slidably abutted, at its the other end, against a guide member 104 extending in parallel with the guide rail 103. A mirror 101 incorporated into the scanning unit 100 acts to focus and expose an image recorded on the original onto a photosensitive member (not shown) through a focusing lens (not shown) and a mirror 105 which is moved at a speed of ½ of that of the scanning unit 100.

A driving means 107 positioned outside of the guide rail 103 operates to shift the scanning unit 100.

On the other hand, the scanning unit 100 has a free end portion only a lower end of which is fixed, and a supply cord 106 is connected, at its one end, to the free end portion of the scanning unit. The supply cord 106 extends from the other end thereof fixed to a frame (not shown) of the scanning apparatus toward a returning direction of the scanning unit 100 and is bent in a U-shape near the one end thereof to be connected to the scanning unit 100. Thus, the supply cord 106 can follow the movement of the scanning unit 100 while changing a position of the bent portion 106a thereof.

In such conventional scanning apparatus, since the driving means 107 including a driving wire 108, pulleys 109a, 109b and 109c, driving motor (not shown) and the like is arranged outside of the guide rail 103 and since electric parts such as a circuit board (not shown) and the like relating to power supply, as well as the supply cord 106, are arranged outside of the free end portion of the scanning unit, the scanning apparatus itself requires a space, along a lengthwise direction of the mirror 105, for installing the driving means 107, supply cord 106 and the like, thus arising a problem that the scanning apparatus cannot be made compact.

Further, in such a conventional scanning apparatus, when the scanning unit 100 reaches its scanning completion position (full scan position), the substantial portion or most part of the supply cord 106 which extends from the bent portion 106a to the above-mentioned other end must be supported by the scanning unit 100. Consequently, if the supply cord 106 has not a certain rigidity, it cannot maintain its proper posture, with the result that the supply cord will flex outwardly or downwardly to contact with the other element or elements of the scanning unit, thus distorting the image to be copied and/or damaging the supply cord 106 itself to threaten the security of the apparatus.

In order to eliminate the above-mentioned disadvantage, the supply cord is normally stiffened by applying a coating layer made of resin such as vinyl chloride or polyolefin onto a sheath of the supply cord 106.

However, in the supply cord coated by such resin layer, since the hardness of the coating resin layer is increased in response to the change in the circumferential condition (particularly, decrease in temperature), the supply cord 106 cannot be smoothly moved in the scanning operation of the scanning unit 100, with the result that the load derived from the slow-moving supply cord is applied to the scanning unit 100. Accordingly, in the case where the supply cord 106 is attached to the free end portion of the scanning unit 100, there arose a problem that, during the scanning operation, the free end portion of the scanning unit 100 was lifted due to the load from the supply cord 106, thus distorting the copied image considerably.

SUMMARY OF THE INVENTION

It is an object of the present invention to provide an original scanning apparatus in which both a driving means for driving a scanning unit and the like and a connecting member such as a supply cord connected to the scanning unit are positioned in the same end of the scanning unit to make the whole scanning apparatus compact.

It is another object of the present invention to provide an original scanning apparatus in which the driving means and the connecting member are arranged adjacent to each other, but the interference between the driving means and the connecting member is effectively prevented so as not to disturb the scanning operation.

It is a further object of the present invention to provide an original scanning apparatus which can prevent the scanning unit from shaking due to unstable movement of the connecting member to obtain a stable copied image.

Other objects of the present invention will be apparent from the following detailed explanation in connection with the embodiments with reference to the drawings.

DETAILED DESCRIPTION OF THE PREFERRED EMBODIMENTS

Figure 1:
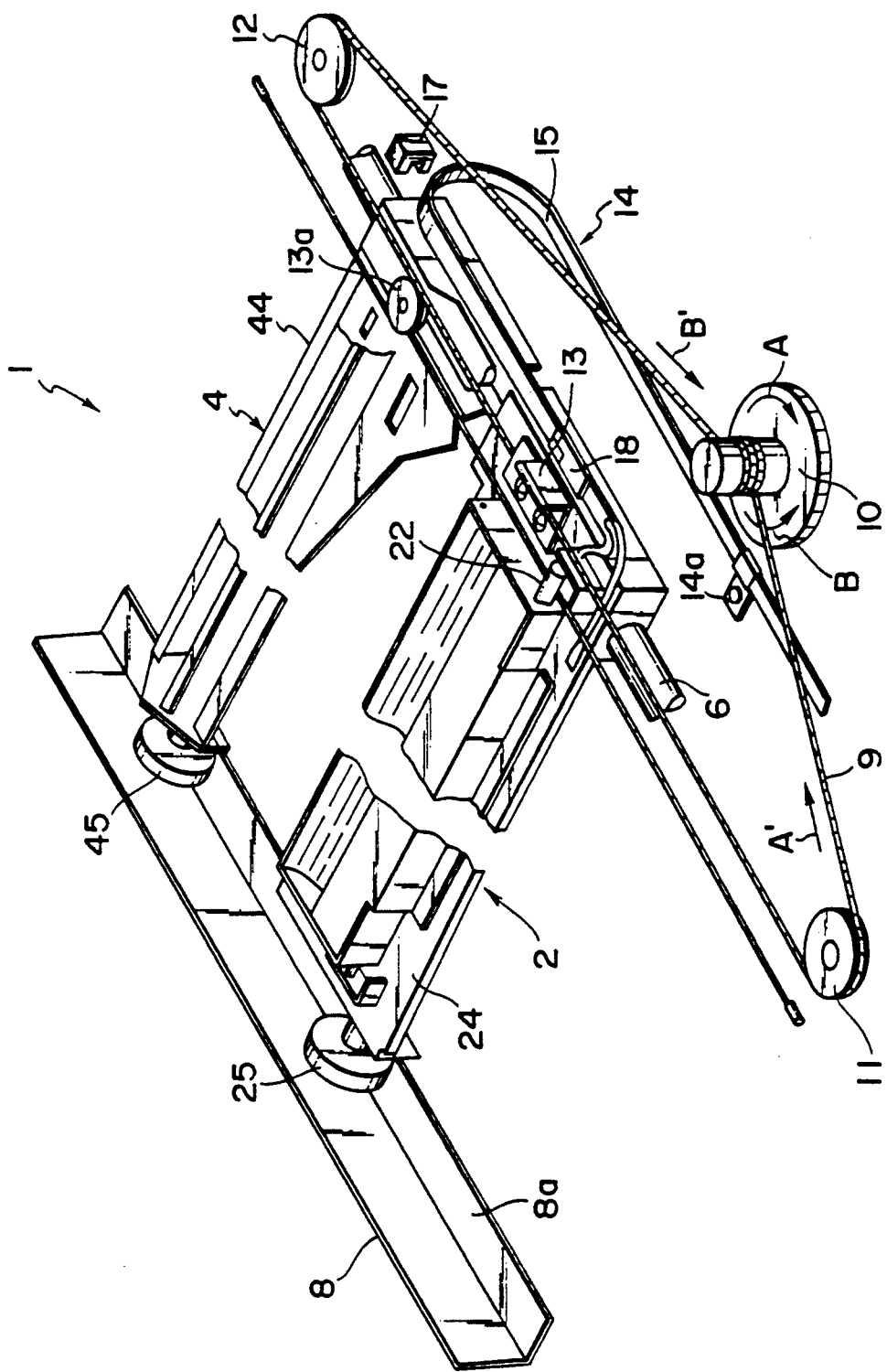
FIG. 1 is a perspective view of an original scanning apparatus according to a first embodiment of the present invention.

The present invention will now be fully explained in connection with illustrated embodiments thereof. FIG. 1 shows an original scanning apparatus according to a first embodiment of the present invention. In FIG. 1, the original scanning apparatus 1 comprises a scanning unit 2 for scanning an original (not shown) positioned on an original supporting plate (not shown). and a mirror unit 4 which can follow the movement of the scanning unit 2 in parallel with the latter at a speed of ½ of that of the scanning unit 2. The scanning unit 2 and mirror unit 4 are guided along a guide rail 6 and a guide member (guide plate) 8 which are arranged in parallel with each other, and are driven by a driving wire 9.

Further, the scanning unit 2 includes, an illumination lamp 22 to which a flexible connecting member or supply cord 14 for supplying electric power to the lamp is connected. The scanning unit 2 further includes a reflection hood (not shown) having a slit and extending in a longitudinal direction of the illumination lamp 22, and the original is exposed by slit light reflected from the reflection hood. More particularly, the scanning unit 2 is constituted by integrally assembling the illumination lamp 22 for illuminating the original and a first mirror (not shown) for reflecting the light from the image (on the original) exposed by the slit light toward the mirror unit 4 on a first mirror support 24.

The first mirror support 24 is slidably and rotatably mounted, at its one end, on the guide 6 and is provided, at its other free end, with a roller 25 which can roll on a guide surface 8a of the guide plate 8.

On the other hand, the mirror unit 4 is arranged in confronting relation with the first mirror (not shown) of the scanning unit 2, and is constituted by integrally assembling a second mirror (not shown) and a third mirror (not shown) on a second mirror support 44. The second mirror acts to reflect the reflected image light from the afore-mentioned first mirror (not shown) downwardly, and the third mirror is arranged in confronting relation with the second mirror and acts to reflect back the reflected image light. Also, the second mirror support 44 is slidably and rotatably mounted, at its one end, on the guide 6 and is provided, at its other free end, with a roller 45 which can roll on a guide surface 8a of the guide plate 8.

As mentioned above, each one end of the scanning unit 2 and mirror unit 4 is slidably and rotatably supported on the guide 6 (this supporting fashion will be referred to as "restraining-support" hereinafter), and each other end thereof is supported on the guide plate 8 to slidably roll thereon (this supporting fashion will be referred to as "free-support" hereinafter).

The reason why the scanning unit and mirror unit are supported in the above-mentioned fashion is that, if both ends of the scanning unit 2 are restraining-supported, when the scanning unit 2 is inclined in a scanning direction, since the scanning unit is subjected to the load at their restraining-supported ends, it will be difficult for the scanning unit to smoothly move, thus preventing the proper scanning operation.

Accordingly, the scanning unit is normally restraining-supported at its one end and is free-supported at the other end, and, it is preferable that the driving means for driving the scanning unit is arranged on a side of the restraining-supported end of the scanning unit, i.e., on a side of the guide rail 6, so that the driving means is not influenced upon the inclination of the scanning unit. The mirror unit 4 is similarly installed.

In this way, the driving wire 9 is arranged on a side of the guide rail 6, and is wound around a driving pulley 10 driven reversibly by means of a motor (not shown) and also wound around driven pulleys 11, 12 positioned out of the scanning area of the scanning unit 2 and mirror unit 4. Further, the driving wire 9 is fixed, at its intermediate portion, to the scanning unit 2 by means of a fixing bracket 13 and is wound around a pulley 13a mounted on the mirror unit 4. When the driving pulley 10 is rotated in a clockwise direction shown by an arrow A, the driving wire 9 is pulled in a direction shown by an arrow A' to pull the first mirror support 24 in the scanning direction through the driven pulley 11 and to pull the pulley 13a mounted on the second mirror support 44 so that the second mirror support 44 is shifted at a speed of ½ of that of the first mirror support 24.

On the other hand, when the scanning unit 2 and mirror unit 4 are returned to their respective home positions, the driving pulley 10 is rotated in a reverse direction (counter-clockwise direction) shown by an arrow B, so that the driving wire 9 is pulled in a direction shown by an arrow B' to retract the second mirror support 44 through the pulley 12 and further to retract the first mirror support 24. In this case, the rollers 25 and 45 arranged on the other ends of the first and second mirror supports 24 and 44 are shifted while rolling on the guide surface 8a of the guide plate 8.

In this way, by arranging the portion of the driving wire 9 and the pulley 13a above the units 2, 4 in an overlapped relation at the side of the guide rail 6, a transverse dimension of the original scanning apparatus 1 can be reduced in a direction (i.e., a longitudinal direction of the slit formed in the reflection hood) perpendicular to the scanning direction in a plane parallel to the plane in which the scanning unit 2 is shifted, thus making the apparatus compact, Further, as shown in FIG. 1, a connecting member or supply cord 14 is arranged at the side of the guide rail 6. In the illustrated embodiment, a movable portion comprising a greater part of the connecting member or supply cord 14, which can be changed in its shape (i.e., can be flexed) during the movement of the scanning unit 2, is situated in parallel with the guide rail 6 outside of the scanning unit 2.

Figure 2:
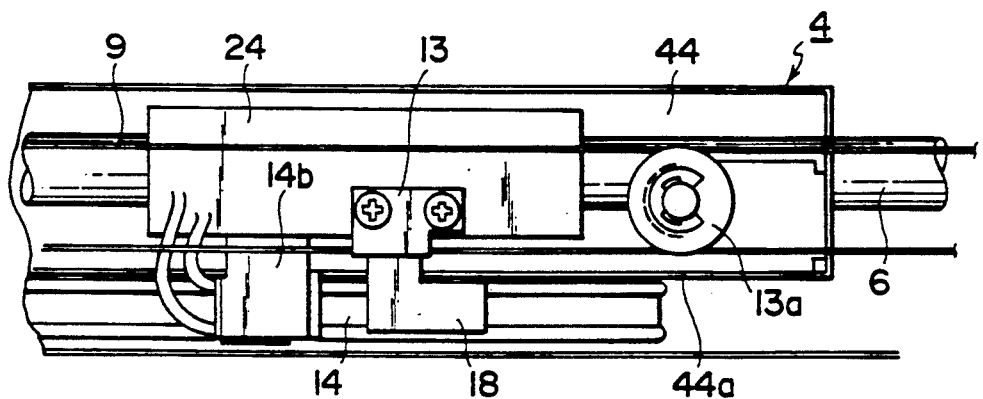
FIG. 2 is a plan view of an attachment portion between a rail and a scanning unit of the original scanning apparatus of FIG. 1.

The connecting member or supply cord 14 is fixed, at its one end, to a lens support 31 (FIG. 3) by a cord holder 14a and is fixed, at its other end, to the first mirror support 24 of the scanning unit 2 by a cord holder 14b (FIG. 2). The connecting member or supply cord 14 extends from the position of the cord holder 14a in a returning direction of the scanning unit 2 along the lens support 31 (FIG. 3) and is bent back upwardly in a U-shaped configuration in the vicinity of the mirror unit 4. Further, the connecting member or supply cord 14 extends from the bent portion 15 in the scanning direction of the scanning unit 2 is fixed to the first mirror support 24 by means of the cord holder 14b.

As the scanning unit 2 is shifted from the home position toward the scanning direction, the connecting member or supply cord 14 follows the movement of the scanning unit 2 while changing the position of its bent portion 15. In this way, since a portion of the driving wire 9 is arranged above the scanning unit 2, and the movable portion of the connecting member or supply cord 14 (which can be shifted in response to the movement of the scanning unit 2) is arranged outside of the scanning unit 2, even if the movable portion of the supply cord becomes longer, the connecting member or supply cord 14 would not touch or contact with the driving wire 9 and the like, thus preventing the inconvenience in the scanning operation.

Further, since the connecting member or supply cord 14 is arranged in an overlapped condition below the driving wire 9 wound around the driving pulley 10 and driven pulleys 11, 12, there is no need to provide a transverse space for exclusively installing the supply cord 14, thus making the transverse dimension of the original scanning apparatus 1 more compact.

As the scanning unit 2 is shifted, the connecting member or supply cord 14 follows the movement of the scanning unit while changing the position of the bent portion 15 thereof. In this case, even if the surrounding temperature decreases to stiffen the resin layer coating the connecting member or supply cord 14 so as to generate the load which tends to lift or float the scanning unit 2, such load from the connecting member or supply cord 14 is resisted or supported by the guide rail 6, thus preventing the floating of the scanning unit 2. Consequently, it is possible to perform the stable scanning operation, thereby obtaining the stable copied image.

Further, since the connecting member or supply cord 14 is situated opposite to the guide plate 8 with respect to the guide rail 6, the load from the connecting member or supply cord 14 creates a moment force around the guide rail 6, which moment force acts against the guide surface 8a of the guide plate 8 downwardly through the roller 25, thus further preventing the floating of the scanning unit 2 to perform the more stable scanning operation.

Figure 3:
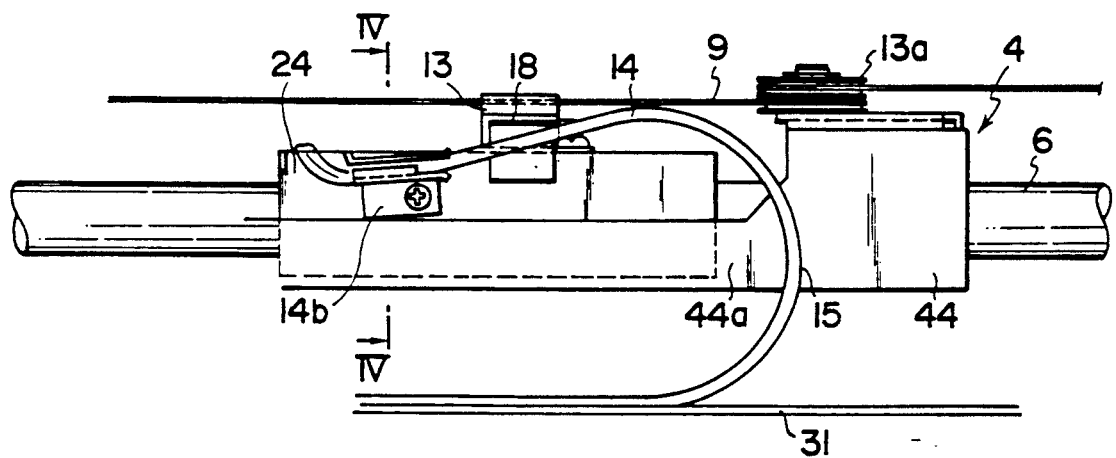
FIG. 3 is an elevational view of the attachment portion of FIG. 2.
Figure 4:
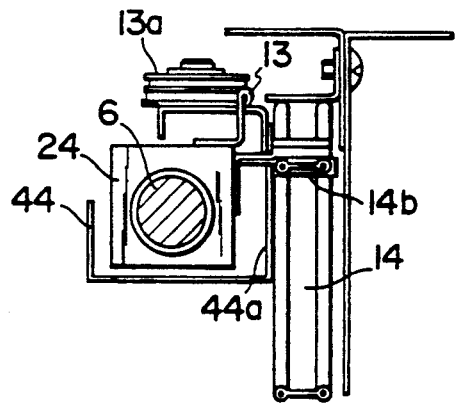
FIG. 4 is a sectional view taken along the line IV—IV of FIG. 3.

FIGS. 2 to 5 show enlarged views of portions of the original scanning apparatus according to the first embodiment of the present invention. In detail, FIGS. 2, 3 and 4 are a plan view, elevational view and sectional view of the attachment portion of the scanning unit at a side of the guide rail, respectively. As shown in these Figures, it, can be understood that the cord holder 14a for the connecting member or supply cord 14 is situated below the fixing bracket 13 for the driving wire 9 and, therefore, the connecting member or supply cord 14 is situated below the driving wire 9. Further, the cord holder 14b is inclined upwardly toward the returning direction of the scanning unit to increase the radius of the bent portion 15.

In this way, the connecting member or supply cord 14 is not subjected to an excessive load, and the portions of the connecting member or supply cord 14 do not interfere with each other. Thus, the scanning operation is not disturbed by the movement of the connecting member or supply cord 14 at all, thereby obtaining the stable copied image.

Figure 5:
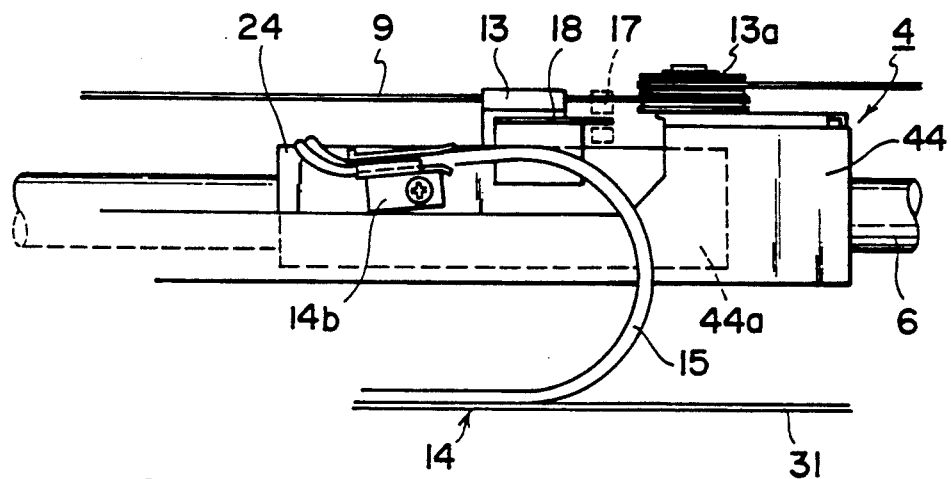
FIG. 5 is a plan view of the attachment portion of the scanning unit of FIG. 3 in a home position thereof.

Further, FIG. 5 shows an elevational view of the scanning unit, similar to FIG. 3, but in the home position. A position sensor 17 is provided for detecting the home position of the scanning unit 2, which position sensor 17 is turned ON or OFF by means of a flag 18 protruded from the side of the first mirror support 24. As shown in FIG. 3, the flag 18 is arranged slightly higher than the cord holder 14b mounted on the first mirror support 24 so that, when the units 2 and 4 are shifted from their home positions toward the scanning direction, the flag 18 disengages from the position sensor (not seen in FIG. 3) and presses the swelled portion near the bent portion 15 of the supply cord 14 from above.

In this way, since the flag 18 also acts to restrain the swelling of the bent portion 15 of the connecting member or supply cord 14, even if any restraining element for the supply cord is not provided, the interference between the connecting member or supply cord 14 and the driving wire positioned above the supply cord can be effectively prevented, and the height of the original scanning apparatus can be reduced, thus making the apparatus compact.

On the other hand, the cord holder 14a mounted on the lens support 31 is so arranged that, as shown in FIG. 5, during the returning operation, as the scanning unit 2 and mirror unit 4 approach the respective home positions, the radius of curvature of the bent portion 15 of the connecting member or supply cord 14 is decreased to separate the connecting member or supply cord 14 from the flag 18. With this arrangement, since the radius of curvature of the bent portion 15 of the connecting member or supply cord 14 is smallest, the interference between the connecting member or supply cord 14 and the position sensor 17 can be prevented in the home position. Consequently, the connecting member or supply cord 14 does not have influence upon the position sensor 17, whereby the position sensor 17 can positively detect the home position.

Figure 6:
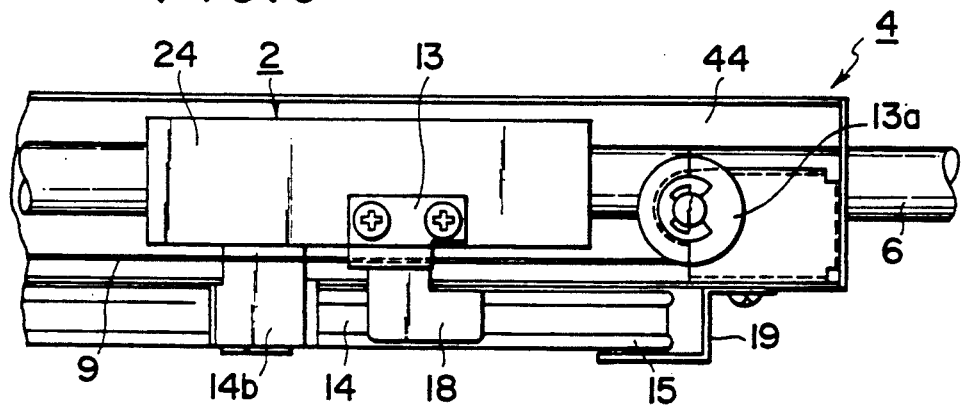
FIG. 6 is a plan view of an attachment portion between a rail and a scanning unit of an original scanning apparatus according to a second embodiment of the present invention.
Figure 7:
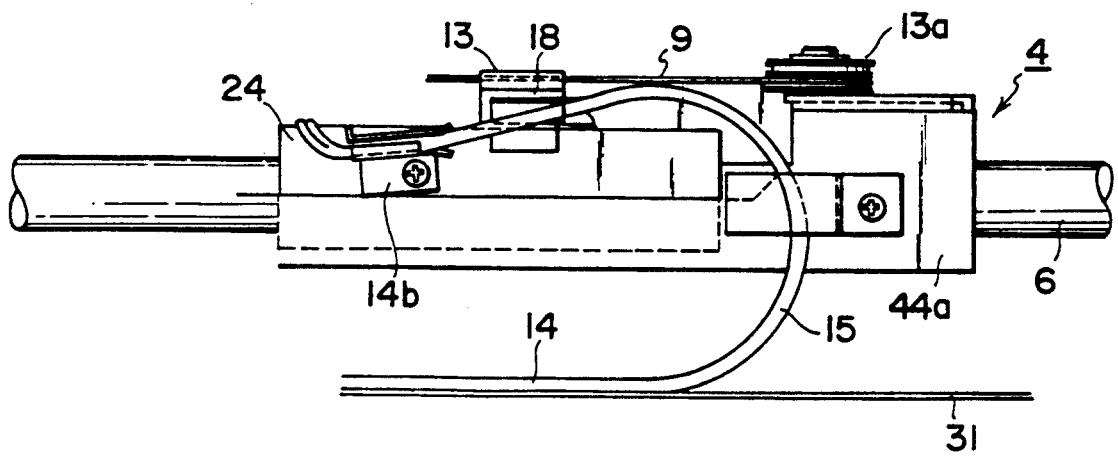
FIG. 7 is an elevational view of the attachment portion of FIG. 6.

FIGS. 6 and 7 show a second embodiment of the present invention, wherein a restraining member is provided on the side of the mirror unit shown in FIGS. 2 and 3, for restraining the movement of the connecting member (supply cord). More particularly, as shown in FIGS. 6 and 7, the connecting member or supply cord 14 is arranged between a side surface 44a of the mirror unit 4 and a restraining member 19 attached thereto.

In this way, by arranging the connecting member or supply cord 14 between the side surface 44a of the mirror unit 4 and the restraining member 19, during the scanning operation, since the bent portion 15 of the connecting member or supply cord 14 is shifted at a speed of about ½ of that of the scanning unit 2, like to the mirror unit 4, the positional relation, between the bent portion 15 of the connecting member or supply cord 14 and the mirror unit 4 remains unchanged during the scanning operation, thus preventing lateral deviation of the supply cord 14.

Figure 8:
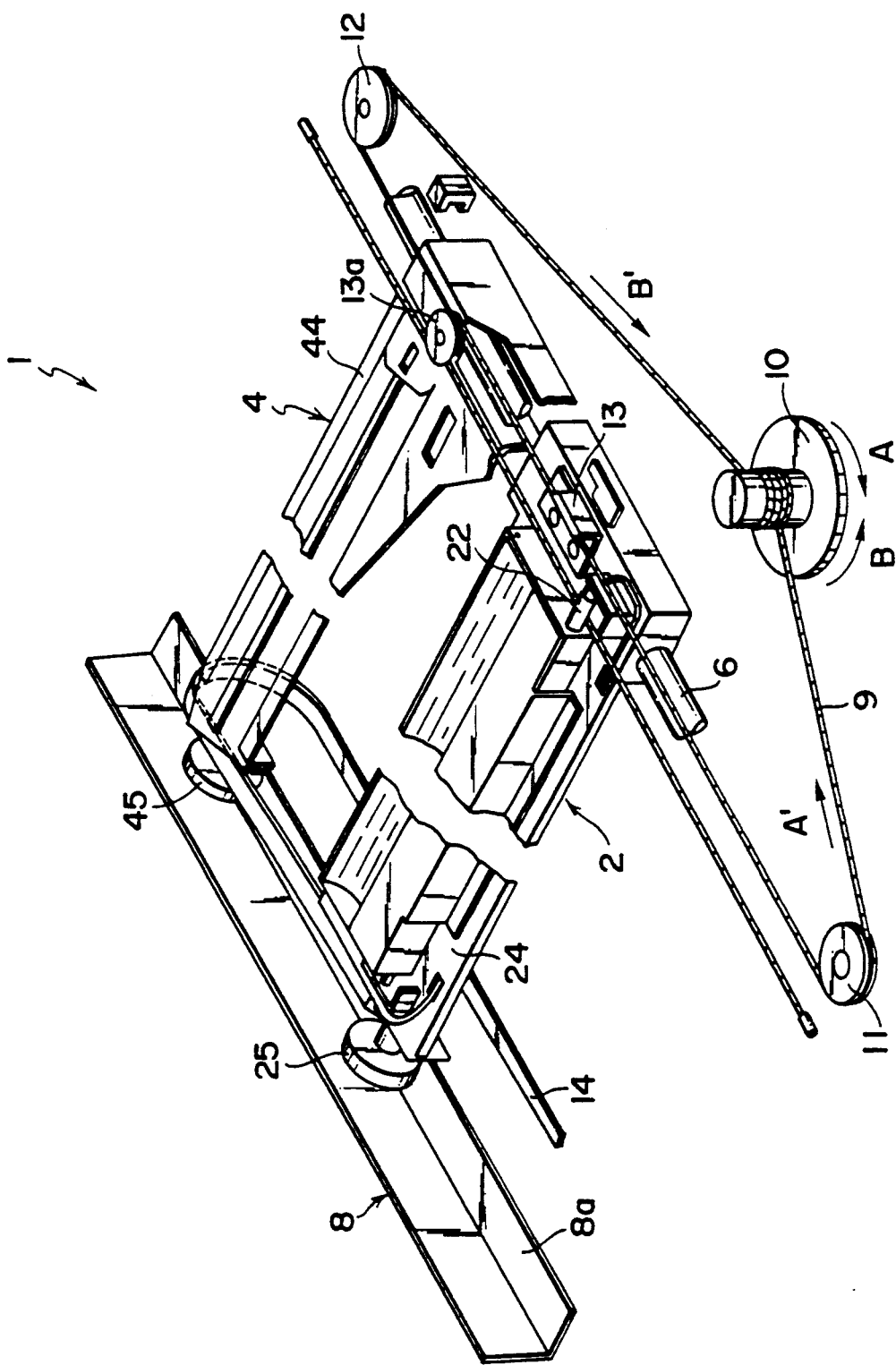
FIG. 8 is a perspective view of an alternation of the original scanning apparatus of FIG. 1.

FIG. 8 shows an alternation of the original scanning apparatus of FIG. 1, wherein the connecting member or supply cord 14 is arranged on a side of the guide plate 8. In the original scanning apparatus shown in FIG. 8, since the connecting member or supply cord 14 is situated on the side of the guide plate 8 which is not restrained from above, there may arise a problem that, in the lower temperature condition, the scanning unit 2 is lifted due to the hardening of the coating resin layer of the supply cord 14.

Figure 9:
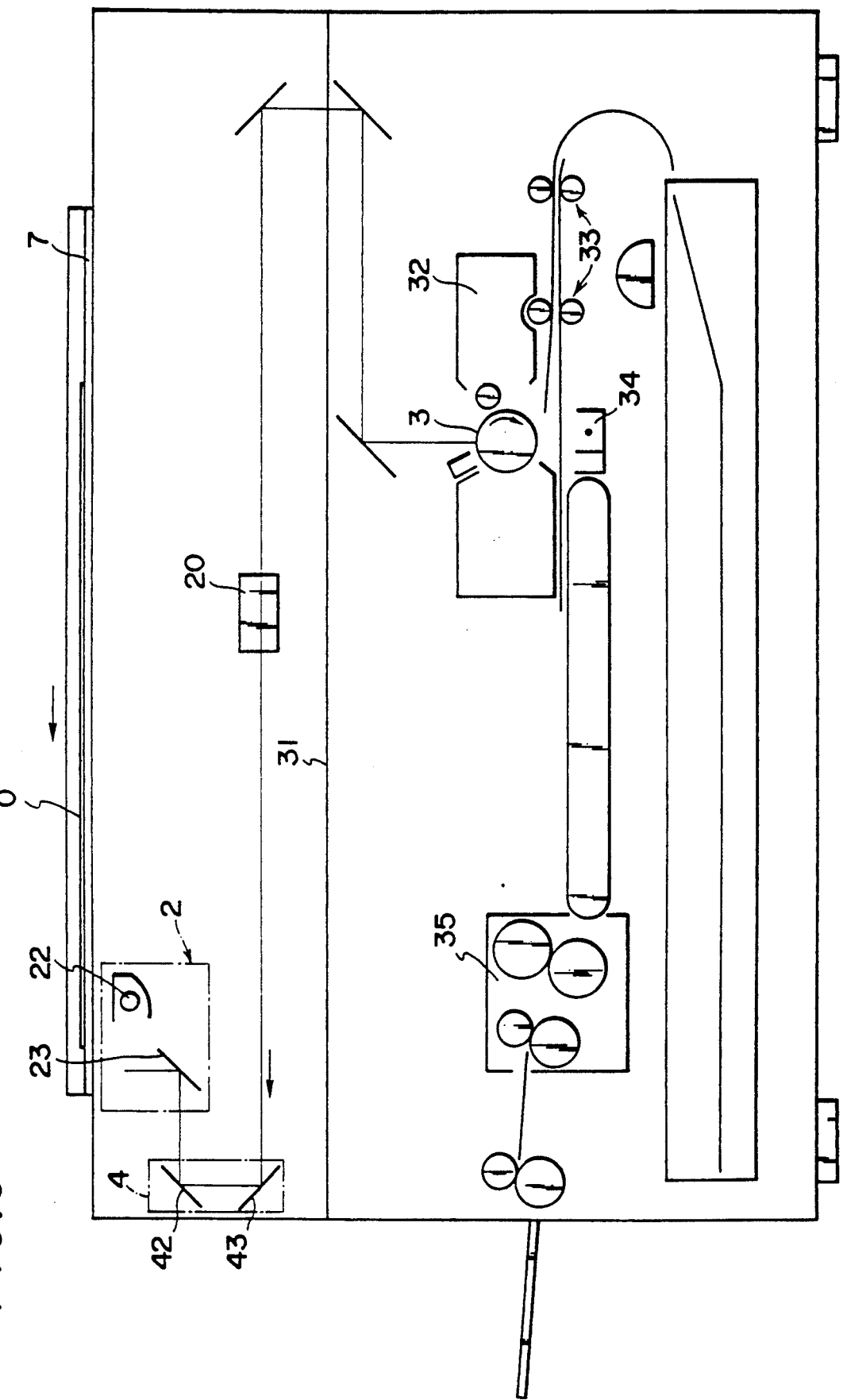
FIG. 9 is a schematic constructional view of an electrophotographic copying machine incorporating the original scanning apparatus of the first embodiment therein.

FIG. 9 shows an example of an electrophotographic copying machine incorporating the original scanning apparatus according to the first embodiment of the present invention therein. In the illustrated electrophotographic copying machine, the light from the image on the original 0 slit-exposed by the illumination lamp 22 is reflected by the first mirror 23 of the scanning unit 2 and the second and third mirrors 42, 43 of the mirror unit 4, and is focused on a photosensitive member 3 through a focusing lens 20. A latent image formed on the photosensitive member 3 is visualized by a developing device 32 and is transferred onto a recording medium (not shown) fed through rollers 33 by means of a transferring and charging device 34, and then is fixed by a fixing device 35 to obtain the copied image.

In this way, in the electrophotographic copying machine, since the original scanning apparatus incorporated therein can always perform the stable scanning operation and is compacted, the electrophotographic copying machine itself can also perform a stable copying operation and is also made compact.

In the illustrated embodiments, while the connecting member was explained as the connecting member or supply cord connected to the illumination lamp, but the connecting member is not limited to the supply cord alone; for example, a connecting cord connected to a read-out element such as a dimmer sensor, temperature fuse, CCD and the like assembled into the scanning unit may be used as the connecting member.

What is claimed is:

1. An original scanning apparatus comprising:
   a scanning unit for scanning an original;
   a guide member for guiding movement of said scanning unit;
   driving means for driving said scanning unit; and
   a connecting member electrically connected to said scanning unit;
   wherein said driving means and said connecting member are arranged substantially parallel to said guide member, and wherein said driving means and said connecting member are arranged to overlap with each other in the vertical direction.

2. An original scanning apparatus according to claim 1, wherein said original scanning apparatus scans the original by a slit exposure, and wherein a slit extends in a direction perpendicular to the scanning direction and parallel to the plane in which said scanning unit is shifted.

3. An original scanning apparatus according to claim 1, wherein said driving means comprises a driving wire connected to said scanning unit to drive said scanning unit, a portion of said driving wire being situated above said guide member.

4. An original scanning apparatus according to claim 1, wherein said driving means includes at least one pulley around which a driving wire connected to said scanning unit is wound, said pulley being arranged above said scanning unit.

5. An original scanning apparatus according to claim 1, wherein said driving means is disposed above said connecting member.

6. An original scanning apparatus according to claim 1, wherein said original scanning apparatus is used with an electrophotographic copying machine and the like.

7. An original scanning apparatus comprising:
   a scanning unit for scanning an original, said scanning unit comprising a light source for illuminating the original;
   a mirror unit for reflecting light from said scanning unit, wherein said mirror unit comprises a restraining member attached thereto and is shifted at a speed of ½ of that of said scanning unit;
   driving means for driving said scanning unit;
   a connecting member electrically connected to said scanning unit, wherein said restraining member restrains said connecting member, and a portion of said connecting member being arranged between a side surface of said mirror unit and said restraining member; and
   a guide member for supporting ad guiding one end of said scanning unit, said guide member preventing movement of said one end of the scanning unit in a vertical direction,
   wherein a part of said driving means is disposed so as to overlap said scanning unit in the vertical direction, and wherein said connecting member is disposed on a side of said guide member.

8. An original scanning apparatus according to claim 7, further comprising a holding member for holding said connecting member, wherein said holding member is attached to a side of said scanning unit, and wherein said holding member holds said connecting member obliquely with respect to said scanning direction.

9. An original scanning apparatus according to claim 8, wherein said holding member holds said connecting member while inclining said connecting member upwardly toward a direction opposite to the scanning direction.

10. An original scanning apparatus comprising:
    a scanning unit for scanning an original, said scanning unit comprising a mirror and a light source for illuminating the original;
    driving means for driving said scanning unit;
    a connecting member electrically connected to said scanning unit;
    a guide member for supporting and guiding one end of said scanning unit, said guide member preventing movement of said one end of the scanning unit in a vertical direction, wherein a part of said driving means is disposed so as to overlap said scanning unit in the vertical direction, and wherein said connecting member is disposed on a side of said guide member; and
    a position detecting member for detecting a position of said scanning unit, said position detecting member being attached to a side of said scanning unit, wherein said position detecting member restrains said connecting member.

11. An original scanning apparatus according to claim 10, further comprising, a holding member for holding said connecting member, wherein said holding member is attached to a side of said scanning unit, and wherein said detecting member is arranged at a higher position than said holding member.

12. An original scanning apparatus comprising:
    a scanning unit for scanning an original, said scanning unit comprising a mirror and a light source for illuminating the original;
    driving means for driving said scanning unit;
    a connecting member electrically connected to said scanning unit; and
    a guide member for supporting and guiding one end of said scanning unit, said guide member preventing movement of said one end of the scanning unit in a vertical direction, wherein a part of said driving means is disposed so as to overlap said scanning unit in the vertical direction, wherein said connecting member is disposed on a side of said guide member, wherein a side portion of said scanning unit comprises a protruded portion for detecting a position of said scanning unit, and wherein said protruded portion is separated from said connecting member upon position detecting of said scanning unit.

13. An original scanning apparatus comprising:
a scanning unit for scanning an original, said scanning unit comprising a mirror and a light source for illuminating the original;
driving means for driving said scanning unit, wherein said driving means comprises a driving wire connected to said scanning unit and at least a first pulley around which said driving wire is wound;
a connecting member electrically connected to said scanning unit, wherein said connecting member is positioned between said driving wire and said pulley; and
a guide member for supporting and guiding one end of said scanning unit, said guide member preventing movement of said one end of the scanning unit in a vertical direction, wherein a part of said driving means is disposed so as to overlap said scanning unit in the vertical direction, and wherein said connecting member is disposed at a side of said guide member.

14. An original scanning apparatus according to claim 13, wherein said driving means further comprises a second pulley, wherein said driving wire connected to said scanning unit is wound around said first and second pulleys, and wherein said connecting member comprises a U-shaped configuration and is positioned between said first and second pulleys.

15. An original scanning apparatus comprising:
a scanning unit for scanning an original;
a connecting member electrically connected to said scanning unit;
a guide member for supporting one end of said scanning unit, which one end is positioned on either side of said scanning unit and for guiding said one end in said scanning direction,
a position of said one end of said scanning unit being restrained by said guide member in a vertical direction, and a position of the other end of said scanning unit being restrained only in a downward direction,
said connecting member being situated on a side of said guide member; and
a mirror unit for reflecting light from said scanning unit wherein said mirror unit is shifted at a speed of ½ of that of said scanning unit, wherein said mirror unit comprises a restraining member attached thereto, said restraining member restrains said connecting member, and wherein a portion of said connecting member is arranged between a side surface of said mirror unit and said restraining member.

16. An original scanning apparatus comprising:
a scanning unit for scanning an original;
a connecting member electrically connected to said scanning unit;
a guide member for supporting one end of said scanning unit, which one end is positioned on either side of said scanning unit and for guiding said one end in said scanning direction,
a position of said one end of said scanning unit being restrained by said guide member in a vertical direction, and a position of the other end of said scanning unit being restrained only in a downward direction,
said connecting member being situated on a side of said guide member; and
a position detecting member for detecting a position of said scanning unit, wherein said position detecting member is attached to a side of said scanning unit, and wherein said position detecting member restrains said connecting member.

17. An original scanning apparatus according to claim 16, further comprising a holding member for holding said connecting member, wherein said holding member is attached to a side of said scanning unit, and wherein said position detecting member is arranged at a higher position than said holding member.

18. An original scanning apparatus comprising;
a scanning unit for scanning an original, a side of said scanning unit comprising a protruded portion for detecting a position of said scanning unit;
a connecting member electrically connected to said scanning unit; and
a guide member for supporting one end of said scanning unit, which one end is positioned on either side of said scanning unit and for guiding said one end in said scanning direction,
a position of said one end of said scanning unit being restrained by said guide member in a vertical direction, and a position of the other end of said scanning unit being restrained only in a downward direction,
said connecting member being situated on a side of said guide member, wherein said protruded portion is separated from said connecting member upon position detecting of said scanning unit.

19. An original scanning apparatus comprising:
a scanning unit for scanning an original;
a connecting member electrically connected to said scanning unit;
a guide member for supporting one end of said scanning unit, which one end is positioned on either side of said scanning unit and for guiding said one end in said scanning direction,
a position of said one end of said scanning unit being restrained by said guide member in an a vertical direction, and a position of the other end of said scanning unit being restrained only in a downward direction,
said connecting member being situated on a side of said guide member; and
a driving means for driving said scanning unit, wherein said driving means comprises a driving wire connected to said scanning unit and at least one pulley around which said driving wire is wound, and wherein said connecting member is positioned between said driving wire and said pulley.

20. An original scanning apparatus comprising:
a scanning unit for scanning an original;
driving means for driving said scanning unit;
a connecting member electrically connected to said scanning unit,
said driving means and said connecting member being arranged on the same one end of said scanning unit, which one end is positioned on either side of said scanning unit in a direction perpendicular to a scanning direction; and
a mirror unit for reflecting light from said scanning unit, wherein said mirror unit is shifted at a speed of ½ of that of said scanning unit, wherein said mirror unit comprises a restraining member attached thereto, wherein said restraining member restrains said connecting member, and wherein a portion of said connecting member is disposed between a side surface of said mirror unit and said restraining member.

21. An original scanning apparatus comprising:
a scanning unit for scanning an original;
driving means for driving said scanning unit;
a connecting member electrically connected to said scanning unit,
said driving means and said connecting member being arranged on the same one end of said scanning unit, which one end is positioned on either side of said scanning unit in a direction perpendicular to a scanning direction; and
a position detecting member for detecting a position of said scanning unit, wherein said position detecting member is attached to a side of said scanning unit, and wherein said position detecting member restrains said connecting member.

22. An original scanning apparatus according to claim 21, further comprising a holding member for holding said connecting member, wherein said holding member is attached to a side of said scanning unit, and wherein said position detecting member is arranged at higher position than said holding member.

23. An original scanning apparatus comprising:
a scanning unit for scanning an original;
driving means for driving said scanning unit; and
a connecting member electrically connected to said scanning unit,
said driving means and said connecting member being arranged on the same one end of said scanning unit, which one end is positioned on either side of said scanning unit in a direction perpendicular to a scanning direction,
wherein a side portion of said scanning unit comprises a protruded portion for detecting a position of said scanning unit, and wherein said protruded portion is separated from said connecting member upon position detecting by said scanning unit.

24. An original scanning apparatus comprising:
a scanning unit for scanning an original;
a driving means for driving said scanning unit, said driving means comprising a driving wire connected to said scanning unit and at least one pulley around which said driving wire is wound, and
a connecting member electrically connected to said scanning unit, wherein said connecting member is positioned between said driving wire and said pulley,
said driving means and said connecting member being arranged on the same one end of said scanning unit, which one end is positioned on either side of said scanning unit in a direction perpendicular to a scanning direction.

25. An original scanning apparatus, comprising:
a scanning unit having a light source for illuminating an original and scanning the original;
a mirror unit for reflecting the light from said scanning unit;
a connecting member electrically connected to said scanning unit; and
a restraining member attached to a side portion of said mirror unit for restraining said connecting member;
wherein said scanning unit moves at a speed of twice that of said mirror unit, and part of said connecting member is disposed between a side surface of said mirror unit and said restraining member.

26. An original scanning apparatus, comprising:
a scanning unit for scanning an original;
a connecting member electrically connected to said scanning unit; and
a detecting member provided at a side of said scanning unit for detecting a position of said scanning unit,
wherein said detecting member also restrains said connecting member.

27. An original scanning apparatus, comprising:
a scanning unit for scanning an original;
a connecting member electrically connected to said scanning unit; and p1 driving means for driving said scanning unit, wherein said driving means comprising a wire connected to said scanning unit and a driving pulley on which said wire is wound, wherein said connecting member is substantially positioned between said wire and driving pulley.

* * * * *

UNITED STATES PATENT AND TRADEMARK OFFICE
CERTIFICATE OF CORRECTION

PATENT NO. : 5,191,377
DATED : March 2, 1993
INVENTOR(S) : KAZUO KAGIURA, ET AL.

Figure 10:
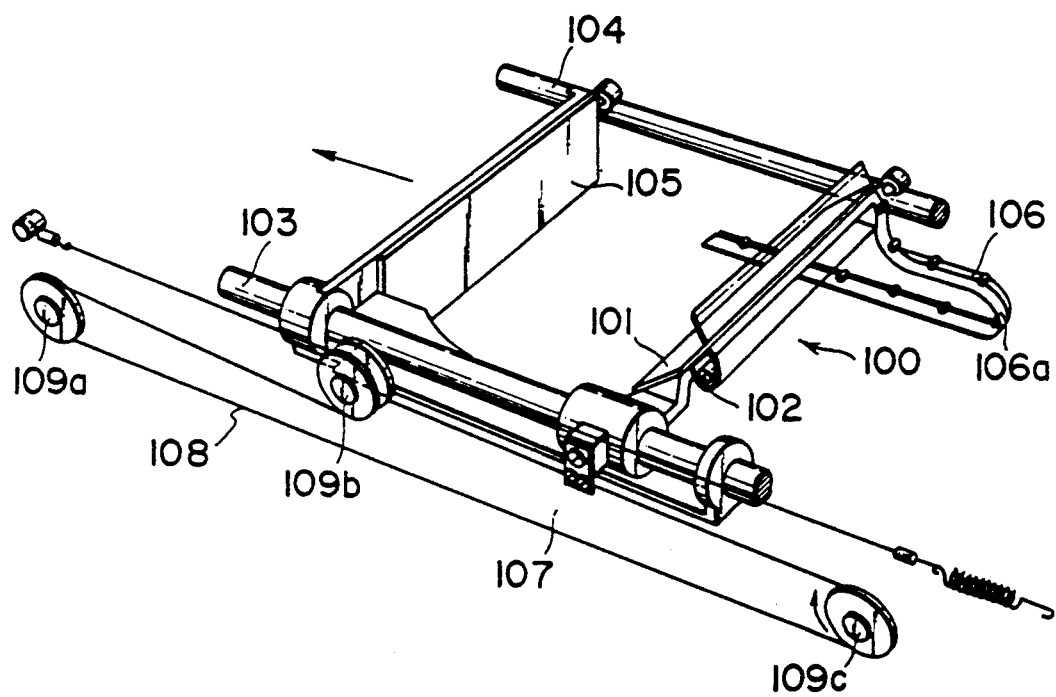
FIG. 10 is a schematic perspective view of a conventional original scanning apparatus.

It is certified that error appears in the above-indentified patent and that said Letters Patent is hereby corrected as shown below:

<u>IN THE DRAWINGS</u>
    Fig. 10, "FIG. 10" should read --FIG. 10 PRIOR ART--.

<u>COLUMN 1</u>
    Line 27, "which" should read --which the--.
    Line 28, "the" should be deleted.

<u>COLUMN 3</u>
    Line 16, "shown)." should read --shown),--.

<u>COLUMN 4</u>
    Line 64, "unit 2" should read --unit 2 and--.

<u>COLUMN 8</u>
    Line 4, "ad" should read --and--.

<u>COLUMN 9</u>
    Line 44, "unit" (first occurrence) should read --unit,--.

UNITED STATES PATENT AND TRADEMARK OFFICE
CERTIFICATE OF CORRECTION

PATENT NO. : 5,191,377

DATED : March 2, 1993

INVENTOR(S) : KAZUO KAGIURA, ET AL.

It is certified that error appears in the above-indentified patent and that said Letters Patent is hereby corrected as shown below:

COLUMN 12
    Line 2, "wound," should read --wound;--.
    Line 21, "member;" should read --member,--.
    Line 38, "pl driving" should read --driving-- and a new paragraph should begin at the beginning of the line.
    Line 40, "comprising" should read --comprises--.

Signed and Sealed this

Twelfth Day of April, 1994

Attest:

Attesting Officer

BRUCE LEHMAN

Commissioner of Patents and Trademarks